(12) United States Patent
Wang

(10) Patent No.: US 9,785,769 B2
(45) Date of Patent: Oct. 10, 2017

(54) COUNTERING ATTACKS ON A CACHE

(71) Applicant: Dalian University of Technology, Dalian, Liaoning (CN)

(72) Inventor: Xingyuan Wang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 25 days.

(21) Appl. No.: 14/438,517

(22) PCT Filed: Mar. 18, 2014

(86) PCT No.: PCT/CN2014/073584
§ 371 (c)(1),
(2) Date: Apr. 24, 2015

(87) PCT Pub. No.: WO2015/139195
PCT Pub. Date: Sep. 24, 2015

(65) Prior Publication Data
US 2016/0246961 A1    Aug. 25, 2016

(51) Int. Cl.
*G06F 11/00* (2006.01)
*G06F 21/55* (2013.01)
(Continued)

(52) U.S. Cl.
CPC ........ *G06F 21/554* (2013.01); *G06F 9/45558* (2013.01); *G06F 12/084* (2013.01); *G06F 12/1416* (2013.01); *G06F 12/1441* (2013.01); *G06F 21/53* (2013.01); *G06F 12/123* (2013.01); *G06F 2009/45587* (2013.01);
(Continued)

(58) Field of Classification Search
CPC .. G06F 12/084; G06F 12/123; G06F 12/1416; G06F 12/1441; G06F 2009/45587; G06F 21/53; G06F 21/554; G06F 2212/1052; G06F 2212/152;
(Continued)

(56) References Cited

U.S. PATENT DOCUMENTS 7,565,492 B2   7/2009   Mckeen et al.
8,341,369 B2   12/2012  Savagaonkar et al.
(Continued)

OTHER PUBLICATIONS

Kim, T., et al., "STEALTHMEM: System-Level Protection Against Cache-Based Side Channel Attacks in the Cloud," Proceeding Security'12 Proceedings of the 21st USENIX conference on Security symposium, pp. 1-16 (Aug. 8, 2012).

(Continued)

*Primary Examiner* — Samson Lemma
(74) *Attorney, Agent, or Firm* — Brundidge & Stanger, P.C.

(57) ABSTRACT

In some examples of a virtual computing environment, multiple virtual machines may execute on a physical computing device while sharing the hardware components corresponding to the physical computing device. A hypervisor corresponding to the physical computing device may be configured to designate a portion of a cache to one of the virtual machines for storing data. The hypervisor may be further configured to identify hostile activities executed in the designated portion of cache and, further still, to implement security measures on those virtual machines on which the identified hostile activities are executed.

19 Claims, 5 Drawing Sheets

(51) Int. Cl.
  *G06F 12/084* (2016.01)
  *G06F 12/14* (2006.01)
  *G06F 21/53* (2013.01)
  *G06F 9/455* (2006.01)
  *G06F 12/123* (2016.01)

(52) U.S. Cl.
  CPC ............... *G06F 2212/1052* (2013.01); *G06F 2212/152* (2013.01); *G06F 2212/6042* (2013.01); *G06F 2221/034* (2013.01)

(58) Field of Classification Search
  CPC ....... G06F 2212/6042; G06F 2212/034; G06F 9/45558
  USPC ............................................ 726/23; 713/193
  See application file for complete search history.

(56) References Cited

U.S. PATENT DOCUMENTS

| | | | | |
|---|---|---|---|---|
| 9,015,838 B1* | 4/2015 | Northup | ................ | G06F 21/554 713/188 |
| 9,098,337 B2* | 8/2015 | Dong | ................... | G06F 9/5033 |
| 2008/0022048 A1 | 1/2008 | Baker | | |
| 2008/0147992 A1* | 6/2008 | Raikin | ................ | G06F 12/0833 711/146 |
| 2009/0222816 A1* | 9/2009 | Mansell | ................ | G06F 12/145 718/1 |
| 2011/0289501 A1* | 11/2011 | Yamasaki | ............. | G06F 3/0622 718/1 |
| 2011/0296406 A1* | 12/2011 | Bhandari | .............. | G06F 9/5044 718/1 |
| 2013/0167146 A1* | 6/2013 | Dong | ................... | G06F 9/5033 718/1 |
| 2014/0115255 A1* | 4/2014 | Takada | ................ | G06F 12/0875 711/119 |

OTHER PUBLICATIONS

Shi, J., et al., "Limiting Cache-based Side-Channel in Multi-tenant Cloud using Dynamic Page Coloring," 2011 IEEE/IFIP 41st International Conference on Dependable Systems and Networks Workshops (DSN-W), pp. 194-199 (Jun. 27-30, 2011).

International Search Report and Written Opinion from International Application No. PCT/CN2014/073584 mailed Dec. 25, 2014.

* cited by examiner

COUNTERING ATTACKS ON A CACHE

CROSS-REFERENCE TO RELATED APPLICATION

This Application is the U.S. National Stage filing under 35 U.S.C. §371 of International Application Ser. No. PCT/CN2014/073584 filed on Mar. 18, 2014. The disclosure of the International Application is hereby incorporated herein by reference in its entirety.

TECHNICAL FIELD

The technologies described herein pertain generally to countering attacks on a cache that is dedicated to a virtual machine.

BACKGROUND

Unless otherwise indicated herein, the approaches described in this section are not prior art to the claims in this application and are not admitted to be prior art by inclusion in this section.

In a virtual computing system, one or more virtual machines may execute simultaneously on a physical computing device and share computing resources corresponding to the physical computing device. Each of the virtual machines may be utilized by a respective client and may be independent of the other virtual machines. The shared computing resources may include data storage, e.g., cache, which may be utilized to store information for the respective clients.

SUMMARY

Technologies are generally described for countering attacks on a cache in a virtual computing system. The various techniques described herein may be implemented in various methods, systems, computer programmable products, and/or computer readable mediums.

In some examples, various embodiments may be implemented as methods. Some methods may include executing a plurality of virtual machines on a computing device; designating a portion of a cache of the computing device as a secured cache area; allocating the secured cache area to one of the plurality of virtual machines; responsive to a request from the one of the plurality of virtual machines to store data, storing the data received from the one of the plurality of virtual machines in the secured cache area; and subsequent to a passage of an amount of time from the storing the data in the secured cache area, deleting the data stored in the secured cache area, prohibiting the one of the plurality of virtual machines from using the secured cache area for a predetermined period, identifying one or more unauthorized activities performed in the designated secured cache area during the predetermined period, and implementing a security measure on one or more of the plurality of virtual machines that performed the one or more identified unauthorized activities.

In some examples, various embodiments may be implemented as systems. Some systems may include a data clearer configured to clear data stored in a secured cache area of a cache subsequent to a passage of a random amount of time from the storing of the data in the secured cache area, the data associated with one of a plurality of virtual machines, an interdiction module configured to prohibit the one of the plurality of virtual machines from using the secured cache area for a predetermined period, a hostile activity tracker configured to identify one or more unauthorized activities performed in the secured cache area during the predetermined period, and a security module configured to implement a security measure to one or more of the plurality of virtual machines that performed the one or more unauthorized activities.

In some examples, various embodiments may be implemented as computer-readable mediums having executable instructions stored thereon. Some computer-readable mediums may store instructions that, when executed, cause one or more processors to perform operations comprising executing a plurality of virtual machines on a computing device; designating a portion of a cache of the computing device to be a secured cache area; allocating the secured cache area to one of the plurality of virtual machines; responsive to a request from the one of the plurality of virtual machines to store data, storing the data received from the one of the plurality of virtual machines in the secured cache area; and subsequent to a passage of an amount of time from the storing the data in the secured cache area, deleting the data stored in the secured cache area, prohibiting the one of the plurality of virtual machines from using the designated secured cache area for a predetermined period, identifying one or more unauthorized activities performed in the designated secured cache area during the predetermined period, and shutting down one or more of the plurality of virtual machines that performed the one or more identified unauthorized activities.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items. In the drawings.

DETAILED DESCRIPTION

Figure 1:
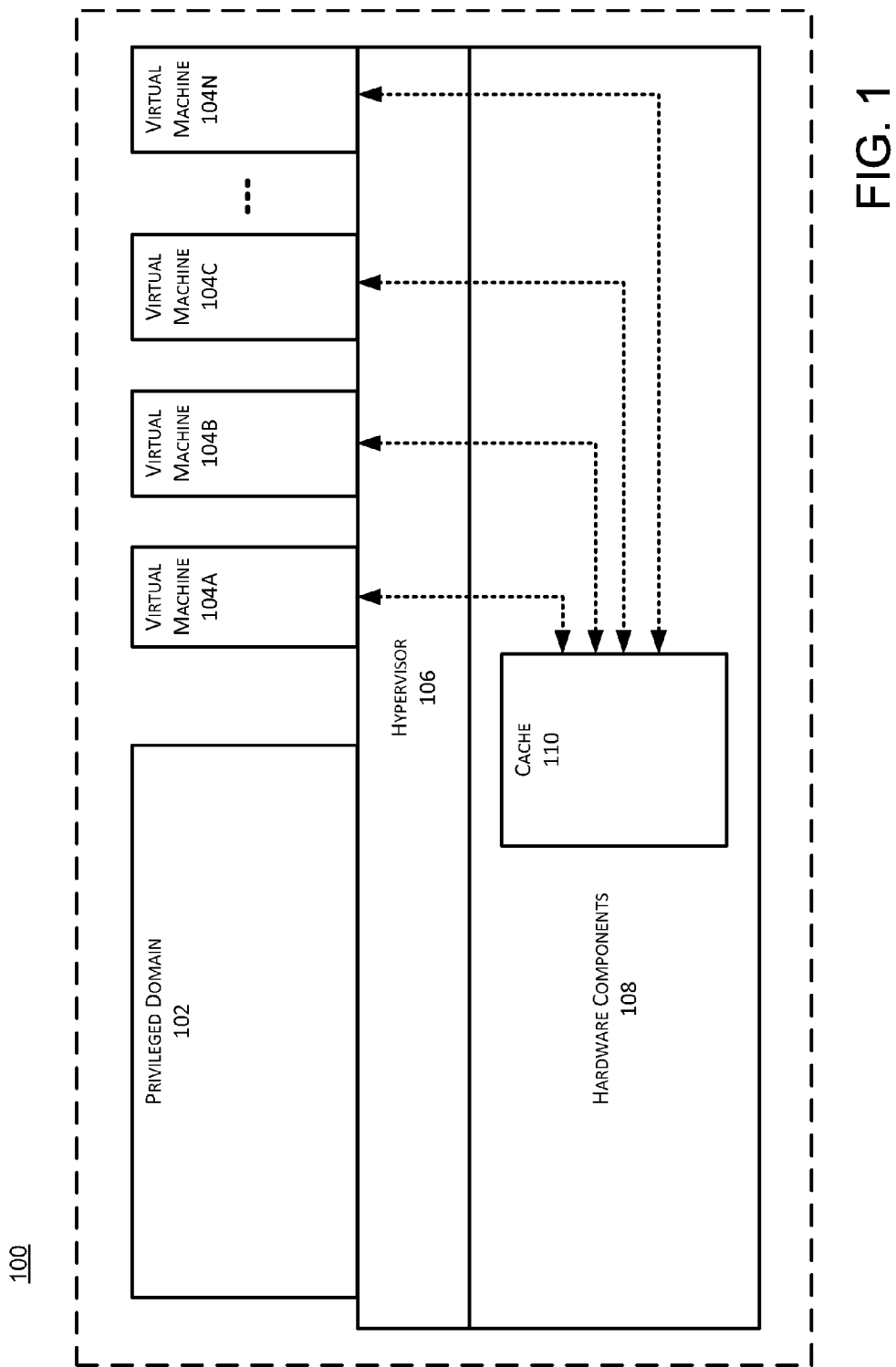
FIG. 1 shows an example system in which countering attacks on a cache may be implemented.

In the following detailed description, references are made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

In a virtual computing system implemented on a physical computing device, the hardware resources of the physical computing device may be shared by multiple virtual machines that run simultaneously. When the multiple virtual machines share a cache corresponding to the physical computing device, hostile virtual machines may gain access to a portion of the cache that may be designated for or dedicated to an authorized virtual machine. To eliminate such unauthorized access to any of the shared resources and to identify hostile virtual machines, a hypervisor of the virtual computing system may be configured to implement security measures for any of the compromised computing resources. Examples of such security measures may include the hypervisor deleting information stored in a compromised portion of the cache and/or prohibiting even authorized virtual machines from accessing the compromised portion of the cache subsequent to a passage of an amount of time after the information or data is stored. That is, since even authorized virtual machines may be prohibited from accessing the compromised portion of the cache after the amount of time has lapsed, any other virtual machines that are still accessing the portion of the cache may be identified as hostile and thus may be shut down.

FIG. 1 shows an example system 100 in which countering attacks on a cache may be implemented, arranged in accordance with at least some embodiments described herein. As illustrated, system 100 may include, at least, a privileged domain 102, multiple virtual machines 104A, 104B, 104C, ..., 104N, a hypervisor 106, and hardware components 108 that may include a cache 110. Unless context requires specific reference to one or more of virtual machines 104A, 104B, 104C, ..., 104N, collective reference may be made to "virtual machines 104."

Privileged domain 102 may refer to a software component that may be configured to manage virtual machines 104. In some examples, multiple parameters of privileged domain 102 may be initialized by hypervisor 106 during a system start-up process. Privileged domain 102 may be granted one or more privileges to manage, via hypervisor 106, different aspects of virtual machines 104. Non-limiting examples of the aspects of virtual machines 104, for which the one or more privileges may be granted to privileged domain 102 to manage, may include starting, interrupting, stopping, inputting/outputting requests, etc. In at least some examples, privileged domain 102 may be configured to retrieve data from cache 110 for one or more of virtual machines 104.

Virtual machines 104 may refer to one or more software emulations of a physical computing device that may be configured to execute software programs in the same manner as a physical computing device. As previously stated, virtual machines 104 may be initiated and managed by privileged domain 102.

In some examples, one or more of virtual machines 104 may be configured to run an operating system that may be independent or different from operating systems that are executing on respective others of virtual machines 104.

Alternatively or additionally, one or more of virtual machines 104 may be configured to execute a single software program, portions of a single software program, or a single process. During the execution, each of virtual machines 104 may be managed by privileged domain 102 to indirectly access and utilize hardware components 108 of example system 100.

Hypervisor 106 may refer to a software module that may be configured to execute directly on one or more of hardware components 108. Concurrently, hypervisor 106 may be configured to receive one or more independent requests for computing tasks from other software modules, e.g., clients, including respective ones of virtual machines 104. To facilitate such requests, hypervisor 106 may be configured to manage access to one or more of hardware components 108 in response to the received independent requests from the different software modules.

In some example embodiments, hypervisor 106 may have direct access to any of hardware components 108. Such direct access may be to the exclusion of one or more other software components that may execute on system 100. Stated another way, other components may not have direct access to hardware components 108. Thus, hypervisor 106 may be configured to store and maintain information or data related to the execution of virtual machines 104, including identification of those of virtual machines 104 that perform read/write activities on cache 110.

As referenced herein, read activities on cache 110 may refer to, e.g., retrieving information that is stored in one or more data storage components of hardware components 108. Write activities on cache 110 may refer to, e.g., storing information to one or more data storage components of hardware components 108.

Hardware components 108 may refer to one or more physical elements that constitute computer system 100. Non-limiting examples of hardware components 108 may include one or more memories, one or more CPUs, one or more network adapters, one or more graphic processing units (GPUs), one or more motherboards, etc.

Cache 110 may refer to at least a portion of the respective one or more memories included in hardware components 108 that may be shared by one or more of virtual machines 104. Typically, cache 110 may provide faster read/write speed than other portions of the respective one or more memories.

In at least one example, cache 110 may be separated into multiple cache lines. One or more of the multiple cache lines may be assigned to one or more of virtual machines 104. The cache lines may be respectively designated to respective ones of virtual machines 104 to perform computing tasks.

Hypervisor 106 may be configured to associate a least recently used (LRU) counter to each of the multiple cache lines. Each LRU counter may be configured to keep track of read/write activity performed on a corresponding cache line. The value of the LRU counter may increase each time a read/write activity is performed by one or more of virtual machines 104 on a respective cache line. In some examples, hypervisor 106 may be configured to designate or dedicate one or more of the cache lines as a secured cache area for one of virtual machines 104, responsive to a request from the virtual machine to store data. The data received from the requesting virtual machine may then be stored in the secured cache area. The requesting one of virtual machines 104 may then be authorized to access the secured cache area. The requesting one of virtual machines 104 may then be referred to as the authorized virtual machine.

The requesting one of virtual machines 104 may not be the only virtual machine that accesses or attempts to access the secured cache. Since the secured cache area may not necessarily be physically isolated from other cache lines, others of virtual machines 104 may still be able to access the secured cache area. For example, a failure in security that would otherwise block access by an unauthorized virtual machine may result in unauthorized access to the secured cache area by one or more of virtual machines 104, which would not necessarily be considered hostile. However, one or more of virtual machines 104 that gain unauthorized access to the secured cache area may be considered hostile when the one or more of virtual machines 104 gain such unauthorized access by disobeying instructions from hypervisor 106 and/or violating prohibitions set by hypervisor 106.

Additionally or alternatively, subsequent to a passage of an amount of time after the data is stored in the secured cache area, hypervisor 106 may delete the stored data from the secured cache area and/or prohibit an authorized one of virtual machines 104 from accessing the secured cache area for a predetermined period. The amount of time may be randomly determined by hypervisor 106 in accordance with multiple random number generation algorithms, e.g., the Yarrow algorithm, the Fortuna, etc. The hostile virtual machines may still attempt to access the secured cache area, ignoring the prohibition. The virtual machines that access the secured cache area may be determined to be hostile as a result of such actions.

Based on the LRU counters of the secured cache area, hypervisor 106 may be configured to detect unauthorized read/write activities on the secured cache area by monitoring the associated LRU counters. That is, unauthorized read/write may be detected by changes in the LRU counter values after the amount of time has elapsed. In at least some examples, hypervisor 106 may be configured to identify those of virtual machines 104 that performed the detected unauthorized read/write activities and implement security measures on the identified virtual machines. Examples of such security measures may include shutting down the identified virtual machines that performed the unauthorized read/write activities.

Thus, FIG. 1 shows an example virtual computing system that may be configured to designate different portions of hardware components 108 to different ones of virtual machines 104 and identify unauthorized access of the hostile virtual machines.

Figure 2:
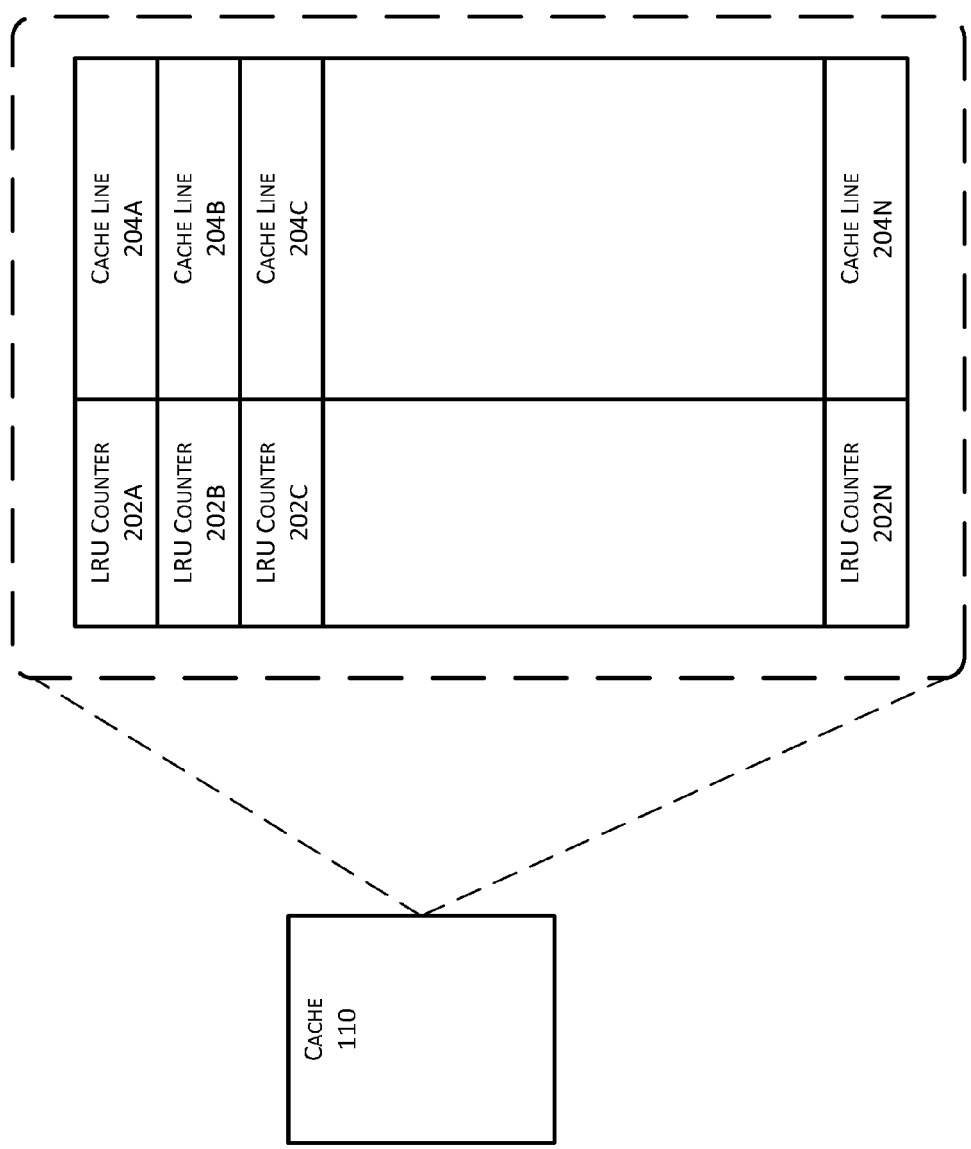
FIG. 2 shows an example cache on which countering attacks may be implemented.

FIG. 2 shows an example configuration 200 of cache 110 on which countering attacks may be implemented, arranged in accordance with at least some embodiments described herein. As depicted, cache 110 may include, at least, multiple LRU counters 202A, 202B, 202C, . . . , 202N respectively associated with cache line 204A, 204B, 204C, . . . , 204N. Unless context requires specific reference to one or more of LRU counters 202A, 202B, 202C, . . . , 202N, collective reference may be made to "LRU counters 202;" similarly, collective reference may be made to "cache lines 204."

LRU counters 202 may refer to one or more components or modules configured to store a count value that indicates a count of read/write activities performed on a corresponding one of cache lines 204. In accordance with various embodiments, LRU counters 202 may be implemented as software, hardware, firmware, or any combination thereof.

Cache lines 204 may refer to one or more portions of cache 110 that may be respectively designated for or dedicated to one or more of virtual machines 104. As described above, one or more of cache lines 204 may be designated as the secured cache area to one of virtual machines 104 that requests a particular computing task. For security purposes, data previously stored in the one or more cache lines 204 may be cleared before the designation occurs, such as preventing a computer virus from being preloaded to the secured cache area.

A size of the secured cache area may be determined by a count of virtual machines 104 for which the secured area may be designated or dedicated, relative to the total size of cache 110. For example, a maximum size of the secured cache area may not exceed a value that equals to the total size of cache 110 divided by the count of designated/dedicated ones of virtual machines 104.

Thus, FIG. 2 shows an example configuration of cache 110 that includes multiple cache lines 204. Each of cache lines 204 may be associated with one of LRU counters 202.

Figure 3:
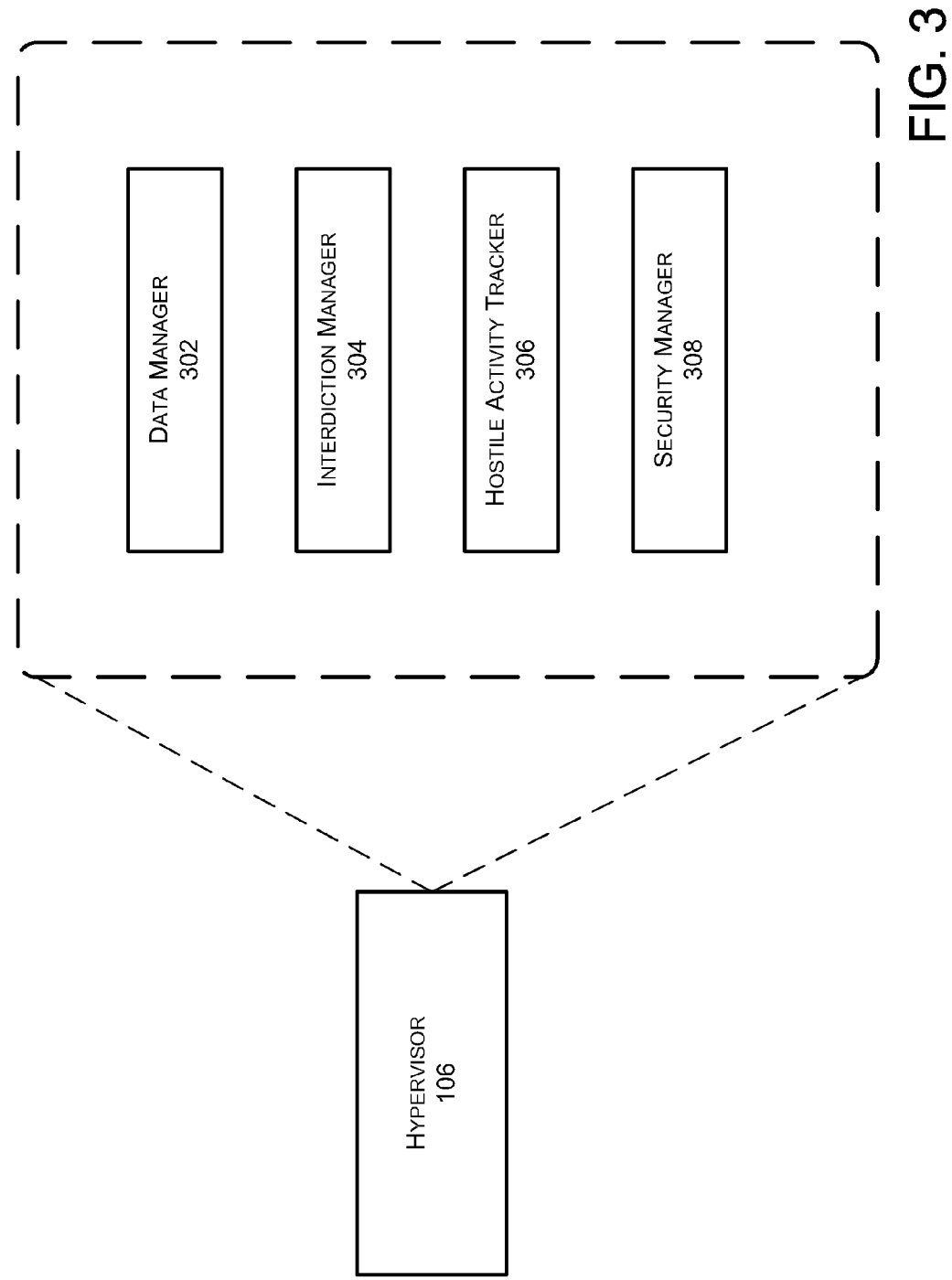
FIG. 3 shows an example hypervisor by which countering attacks on a cache may be implemented.

FIG. 3 shows an example configuration 300 of hypervisor 106 by which countering attacks on a cache may be implemented, arranged in accordance with at least some embodiments described herein. As depicted, example hypervisor 106 may include, at least, a data clearer 302, an interdiction module 304, a hostile activity tracker 306, and a security module 308.

Data manager 302 may refer to a software module that may be configured to clear data that has been previously stored in the cache lines 204 before cache lines 204 were designated to the requesting one of virtual machines 104, e.g., the authorized virtual machine. Data manager 302 may be, additionally or alternatively, configured to clear the data stored in the secured cache area of cache 110 subsequent to a passage of the amount of time after the data has been stored. In accordance with at least some examples, data clearer 302 may be configured to clear the data at least once during a predetermined cycle, e.g., every twenty minutes. LRU counters 202 may be reset to zero as data manager 302 clears the data.

Interdiction manager 304 may refer to a software module that may be configured to prohibit all virtual machines 104, from utilizing the secured cache area for a predetermined period after the data has been cleared by data manager 302. Thus, due to such prohibition, if there are no unauthorized virtual machines accessing the secured cache area during the predetermined period, the corresponding ones of LRU counters 202 may remain a same value. As stated above, since cache 110 may not be physically isolated by interdiction manager 304, unauthorized virtual machines may ignore such prohibition and access the secured cache area.

Hostile activity tracker 306 may refer to a software module that may be configured to identify the unauthorized read/write activities performed in the secured cache area during the predetermined period. That is, hostile activity tracker 306 may detect unauthorized read/write activities based on the values of the corresponding ones of LRU counters 202 during the predetermined period. Since hypervisor 106 may keep track identification of those of virtual machines 104 that perform read/write activities on cache 110, hostile activity tracker 306, as a component of hypervisor 106, may be configured to identify those of virtual machines 104 that performed the unauthorized read/write activities based on the information or data maintained by hypervisor 106. The identified virtual machines may be deemed to be hostile by security module 308 since these virtual machines ignore the prohibition issued by interdiction module 304.

Security manager 308 may refer to a software module that may be configured to implement one or more security measures that may affect the secured cache area and/or the virtual machines detected and/or identified as having performed one or more of the unauthorized read/write activities. Examples of such security measures may include shutting down the above identified virtual machines and/or warning a system administrator. As referenced herein, a system administrator may refer to a person who is responsible for upkeep, configuration, and reliable operation of the computing device.

In some example embodiments, security manager 308 may be configured to execute a self-diagnosis process before such implementation to thereby detect hardware failures that may cause the identified virtual machines to access the secured cache area. A self-diagnosis process may refer to one or more tests run by the example system, which may include memory test, network connection test, data bus test, etc. If such hardware failures exist, security module 308 may be configured to notify the system administrator of the hardware failures and may render the security measure unnecessary. If such hardware failures do not exist, security module 308 may be configured to implement the security measure on the identified virtual machines to stop the unauthorized read/write activities.

Thus, FIG. 3 shows an example configuration of hypervisor 106 that may include at least data clearer 302, interdiction module 304, hostile activity tracker 306, and security module 308, which individually, or in combination, may be configured to identify unauthorized activities and further implement the security measure to prevent such activities.

Figure 4:
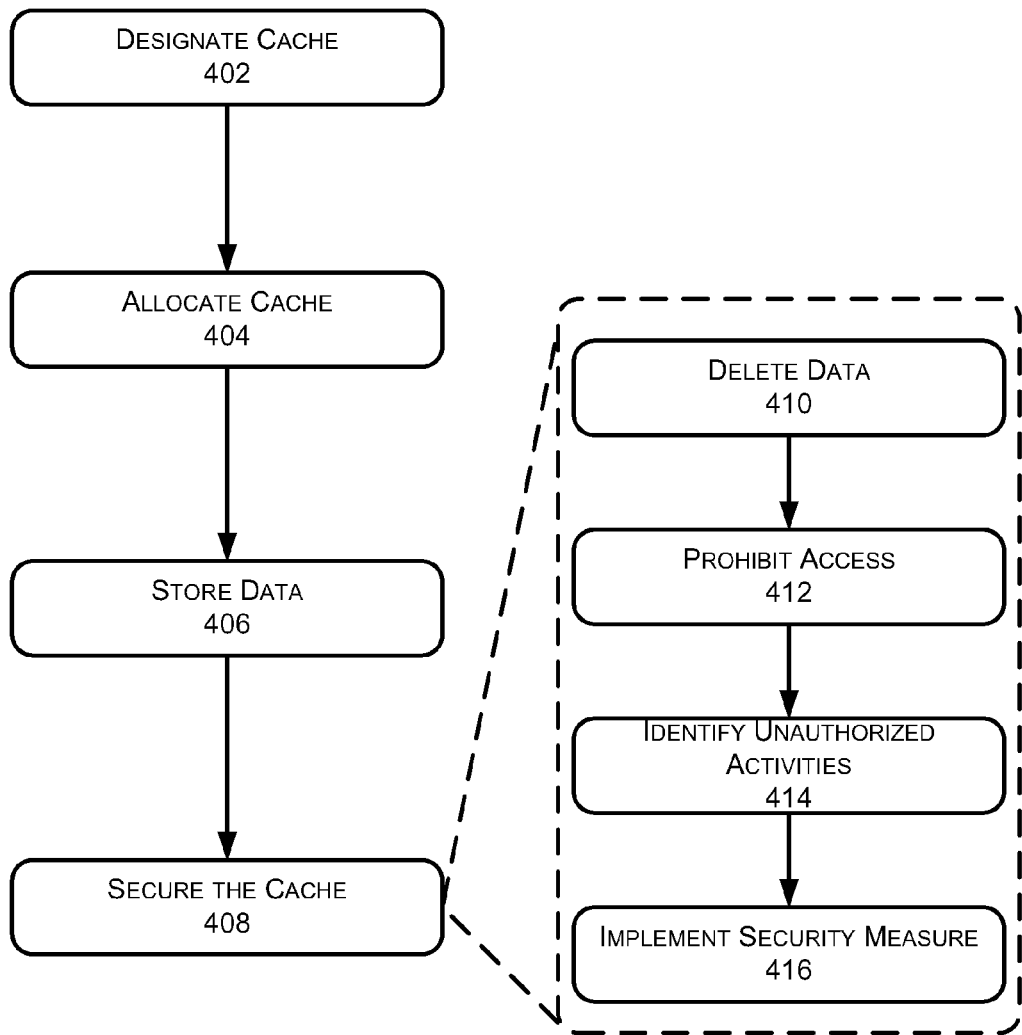
FIG. 4 shows an example configuration of a processing flow of operations by which countering attacks on a cache may be implemented.

FIG. 4 shows an example configuration of a processing flow of operations by which countering attacks on a cache may be implemented, arranged in accordance with at least some embodiments described herein. As depicted, processing flow 400 may include sub-processes executed by various components that are part of example system 100. However, processing flow 400 is not limited to such components, and modification may be made by re-ordering two or more of the sub-processes described here, eliminating at least one of the sub-processes, adding further sub-processes, substituting components, or even having various components assuming sub-processing roles accorded to other components in the following description. Processing flow 400 may include various operations, functions, or actions as illustrated by one or more of blocks 402, 404, 406, 408, 410, 410, 412, 414, and/or 416. Processing may begin at block 402.

Block 402 (Designate Cache) may refer to hypervisor 106 designating one or more of cache lines 204 as a secured cache area designated for or dedicated to one of virtual machines 104, responsive to a request from the virtual machine to store data. As described above, each of the designated one or more of cache lines 204 may be associated with one of LRU counters 202. The associated LRU counter may be configured to keep track read/write activities performed in a corresponding one of cache lines 204. The value of the LRU counter may increase with each read/write activity performed by one or more of virtual machines 104 on the corresponding one of cache lines 204. Block 402 may be followed by block 404.

Block 404 (Allocate Cache) may refer to hypervisor 106 allocating the secured cache area to the requesting one of virtual machines 104. The requesting virtual machine may then be authorized to access the secured cache area, and thus be referred to as the authorized virtual machine. Block 404 may be followed by block 406.

Block 406 (Store Data) may refer to hypervisor 106 storing the data, received from the authorized virtual machine, in the secured cache area. Block 406 may be followed by block 408.

Block 408 (Secure the Cache) may refer to hypervisor 106 performing one or more operations to detect and/or identify hostile ones of virtual machines 104, and, further, to implement a security measure to stop hostile ones of virtual machines 104 from accessing the secured cache area. Block 408 may include sub-blocks 410, 412, 414.

Sub-block 410 (Delete Data) may refer to data manager 302 deleting data that was previously stored in the cache lines before the cache lines were designated for or dedicated to the requesting one of virtual machines 104, e.g., the authorized virtual machine. Data manager 302 may be further configured to clear the data stored in the secured cache area of cache 110 subsequent to a passage of an amount of time after the data is stored. The amount of time may be randomly determined by hypervisor 106 in accordance with the aforementioned multiple random number generation algorithms in some embodiments. In at least some examples, data manager 302 may be configured to clear the data at least once during a predetermined cycle, e.g., every twenty minutes. Further to the examples, LRU counters 202 may be reset to zero as data manager 302 clears the data. Sub-block 410 may be followed by sub-block 412.

Sub-block 412 (Prohibit Access) may refer to interdiction manager 304 prohibiting the authorized virtual machine, along with all remaining ones of virtual machines 104, from utilizing the secured cache area for a predetermined period after the data has been cleared by data manager 302. Thus, due to such prohibition, if there are no unauthorized virtual machines accessing the secured cache area during the predetermined period, the corresponding ones of LRU counters 202 may remain a same value. Sub-block 412 may be followed by sub-block 414.

Sub-block 414 (Identify Unauthorized Activities) may refer to hostile activity tracker 306 identifying the unauthorized read/write activities performed in the secured cache area during the predetermined period. That is, hostile activity tracker 306 may detect unauthorized read/write activities based on the count values of the corresponding ones of LRU counters 202 during the predetermined period. Since hypervisor 106 may keep track identification of those of virtual machines 104 that perform read/write activities on cache 110, hostile activity tracker 306, as a component of hypervisor 106, may be configured to identify those of virtual machines 104 that performed the unauthorized read/write activities based on the information maintained by hypervisor 106. Such virtual machines may be determined as hostile by security module 308 since these virtual machines ignore the prohibition issued by interdiction manager 304. Sub-block 414 may be followed by sub-block 416.

Sub-block 416 (Implement Security Measure) may refer to security module 308 implementing a security measure on the virtual machines identified has having performed the unauthorized read/write activities. Examples of the security measure may include at least one of shutting down the above identified virtual machines and/or warning the system administrator.

As stated before, in some example embodiments, security module 308 may be configured to execute a self-diagnosis process before such implementation to detect hardware failures that may cause the identified virtual machines to access the secured cache area. If such hardware failures exist, security module 308 may be configured to notify the system administrator of the hardware failures and may not perform the security measure. If such hardware failures do not exist, security module 308 may be configured to implement the security measure on the identified virtual machines to stop the unauthorized read/write activities.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 5:
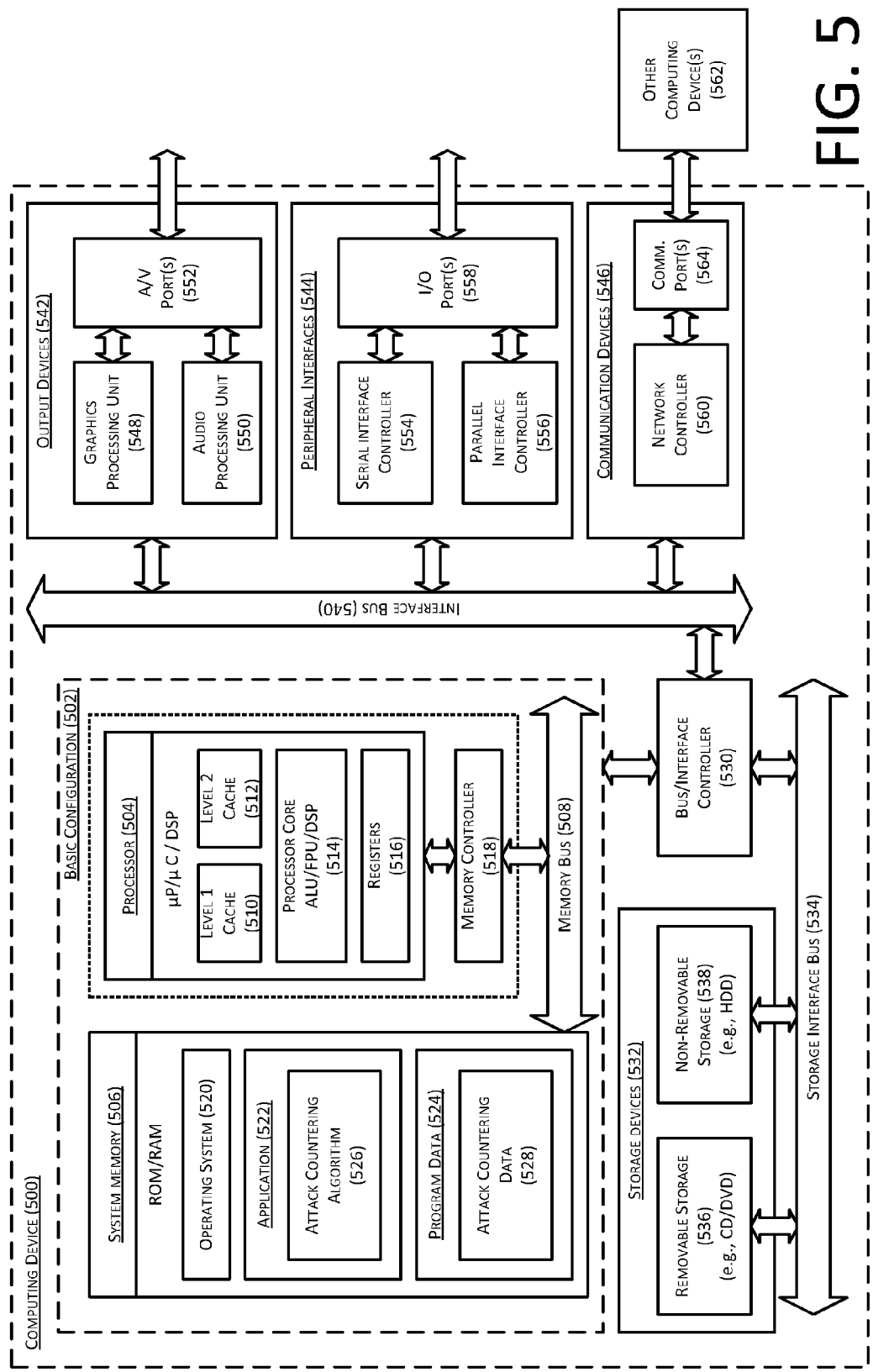
FIG. 5 shows a block diagram illustrating an example computing device that is arranged for countering attacks on a cache may be implemented, all arranged in accordance with at least some embodiments described herein.

FIG. 5 shows a block diagram illustrating an example computing device that is arranged for countering attacks on a cache may be implemented, arranged in accordance with at least some embodiments described herein. In a very basic configuration, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (μP), a microcontroller (μC), a digital signal processor (DSP), or any combination thereof. Processor 504 may include one or more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524. Application 522 may include an attack countering algorithm 526 that may be configured to perform the functions as described herein including those described with respect to process 400 of FIG. 4. Program data 524 may include attack countering data 528 that may be useful for operations such as identifying the hostile ones of virtual machines 104 with attack countering algorithm 526 as is described herein. In some embodiments, application 522 may be arranged to operate with program data 524 on operating system 520 such that implementations of attack countering may be provided as described herein. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a compact disc (CD), a digital versatile disc (DVD), a digital tape, a computer memory, etc.; and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A method to counter attacks on a cache, the method comprising:
    executing a plurality of virtual machines on a computing device;
    designating a portion of a cache of the computing device as a secured cache area;
    allocating the secured cache area to one of the plurality of virtual machines;
    responsive to a request from the one of the plurality of virtual machines to store data, storing the data received from the one of the plurality of virtual machines in the secured cache area; and
    subsequent to a passage of a determined amount of time from the storage of the data in the secured cache area:
        deleting the data stored in the secured cache area after the passage of the determined amount of time,
        prohibiting the one of the plurality of virtual machines from using the secured cache area for a predetermined period,
        in response to prohibition of the one of the plurality of virtual machines, identifying one or more unauthorized activities performed in the designated secured cache area during the predetermined period, and
        implementing a security measure on one or more of the plurality of virtual machines that performed the one or more identified unauthorized activities.

2. The method of claim 1, further comprising clearing data previously stored in the portion of the cache before the designation of the portion of the cache.

3. The method of claim 1, wherein the secured cache area is smaller than a maximum size that is determined based on a size of the cache and a quantity of the plurality of virtual machines.

4. The method of claim 1, wherein the implementation of the security measure includes shutting down the one or more of the plurality of virtual machines that performed the one or more identified unauthorized activities.

5. The method of claim 4, further comprising troubleshooting the one or more unauthorized activities before shutting down one or more of the plurality of virtual machines.

6. The method of claim 1, further comprising deleting the data stored in the secured cache area at least once during a predetermined cycle.

7. An attack detecting system, comprising:
    a hardware processor coupled to a memory that stores program data which, in response to execution by the processor, causes the attack detecting system to:
        clear data stored in a secured cache area of a cache subsequent to a passage of a determined amount of time from the storage of the data in the secured cache area, the data associated with one of a plurality of virtual machines;
        prohibit the one of the plurality of virtual machines from using the secured cache area for a predetermined period;
        in response to prohibition of the one of the plurality of virtual machines, identify one or more unauthorized activities performed in the secured cache area during the predetermined period; and
        implement a security measure to one or more of the plurality of virtual machines that performed the one or more unauthorized activities.

8. The system of claim 7, wherein the hardware processor further causes the attack detecting system to clear data previously stored in the secured cache area.

9. The system of claim 7, wherein the secured cache area is smaller than a maximum size that is determined based on a size of the cache and a quantity of the plurality of virtual machines.

10. The system of claim 7, wherein the implementation of the security measure includes shutting down at least one of the one or more virtual machines by which the one or more unauthorized activities were performed.

11. The system of claim 7, wherein the secured cache area includes a plurality of cache lines, each of which is associated with a Least Recently Used (LRU) counter that records a count of activities performed in each cache line.

12. The system of claim 8, wherein the hardware processor further causes the attack detecting system to delete the data stored in the secured cache area at least once in a predetermined cycle.

13. The system of claim 10, wherein the hardware processor further causes the attack detecting system to troubleshoot a process before shut down of at least one of the one or more virtual machines.

14. A non-transitory computer-readable medium that stores executable-instructions that, when executed, cause one or more processors to:
 execute a plurality of virtual machines on a computing device;
 designate a portion of a cache of the computing device to be a secured cache area;
 allocate the secured cache area to one of the plurality of virtual machines;
 responsive to a request from the one of the plurality of virtual machines to store data, store the data received from the one of the plurality of virtual machines in the secured cache area; and
 subsequent to a passage of a determined amount of time from the storage of the data in the secured cache area:
  delete the data stored in the secured cache area after the passage of the determined amount of time,
  prohibit the one of the plurality of virtual machines from using the designated secured cache area for a predetermined period,
  in response to the prohibition of the one of the plurality of virtual machines, identifying one or more unauthorized activities performed in the designated secured cache area during the predetermined period, and
  shut down one or more of the plurality of virtual machines that performed the one or more identified unauthorized activities.

15. The non-transitory computer-readable medium of claim 14, wherein the stored executable-instructions, when executed, further cause the one or more processors to clear data previously stored in the portion of the cache before the designation of the portion of the cache.

16. The non-transitory computer-readable medium of claim 14, wherein the secured cache area includes a plurality of cache lines, each of which is associated with a Least Recently Used (LRU) counter that records a count of activities performed in each cache line.

17. The non-transitory computer-readable medium of claim 14, wherein the stored executable-instructions, when executed, further cause the one or more processors to troubleshoot the one or more unauthorized activities before shut down of one or more of the plurality of virtual machines.

18. The non-transitory computer-readable medium of claim 14, wherein the stored executable-instructions, when executed, further cause one or more processors to delete the data stored in the secured cache area at least once in a predetermined cycle.

19. The non-transitory computer-readable medium of claim 14, wherein the secured cache area is smaller than a maximum size that is determined by evenly dividing a size of the cache by a quantity of the plurality of virtual machines.

* * * * *